United States Patent [19]

Londrigan et al.

[11] Patent Number: 4,714,717
[45] Date of Patent: Dec. 22, 1987

[54] POLYESTER POLYOLS MODIFIED BY LOW MOLECULAR WEIGHT GLYCOLS AND CELLULAR FOAMS THEREFROM

[75] Inventors: Michael E. Londrigan, Safety Harbor; Michael J. Skowronski, Largo, both of Fla.

[73] Assignee: Jim Walter Resources, Inc., Birmingham, Ala.

[21] Appl. No.: 34,970

[22] Filed: Apr. 6, 1987

[51] Int. Cl.$^4$ ............................................ C08G 18/14
[52] U.S. Cl. ................................... 521/131; 252/182; 428/422.8; 428/423.1; 528/296; 528/301
[58] Field of Search ................... 521/131; 252/182; 528/296, 301; 428/422.8, 423.1

[56] References Cited

U.S. PATENT DOCUMENTS

| | | | |
|---|---|---|---|
| 3,647,759 | 3/1972 | Walker | 260/75 R |
| 4,100,354 | 7/1978 | Owen, Jr. | 560/89 |
| 4,237,238 | 12/1980 | DeGuiseppi et al. | 521/131 |
| 4,246,365 | 1/1981 | Wiedermann et al. | 521/172 |
| 4,346,229 | 8/1982 | Derr et al. | 560/91 |
| 4,400,477 | 8/1983 | Blanpied | 521/112 |
| 4,411,949 | 10/1983 | Snider et al. | 428/304.4 |
| 4,444,915 | 4/1984 | Grube et al. | 521/131 |
| 4,444,918 | 4/1984 | Brennan | 521/131 |
| 4,444,920 | 4/1984 | Brennan | 521/173 |
| 4,469,821 | 9/1984 | Anderson | 521/131 |
| 4,506,090 | 3/1985 | Brennan et al. | 560/91 |
| 4,526,908 | 7/1985 | Magnus et al. | 521/172 |
| 4,539,341 | 9/1985 | Hallmark et al. | 521/172 |
| 4,544,679 | 10/1985 | Tideswell et al. | 521/116 |

Primary Examiner—Maurice J. Welsh
Attorney, Agent, or Firm—James W. Grace; Charles W. Vanecek

[57] ABSTRACT

A polyester polyol suitable for use in a foam-forming reaction with an organic polyisocyanate in the manufacture of a polyurethane or polyisocyanurate foam, the polyester polyol being the reaction product of polycarboxylic acid and polyol components, wherein the polyol component comprises (a) at least one alkylene glycol of the formula:

$$HO-R_1-OH$$

wherein $R_1$ is a straight or branched chain alkylene group having two to five carbon atoms, and is unsubstituted or substituted by at least one member selected from the group consisting of halogen, hydroxy, nitro and amino,
(b) at least one higher alkylene glycol, and
(c) optionally at least one additional polyol.

45 Claims, No Drawings

POLYESTER POLYOLS MODIFIED BY LOW MOLECULAR WEIGHT GLYCOLS AND CELLULAR FOAMS THEREFROM

BACKGROUND OF THE INVENTION

1. Field of the Invention

This invention relates to the preparation of polyester polyols from acid residues and polyols utilizing low molecular weight glycols for property enhancement. The polyols are useful in the preparation of cellular foam materials, particularly polyisocyanurate and polyurethane foams.

2. Description of the Prior Art

The preparation of foams characterized by isocyanurate and urethane linkages is well known in the art. Generally, these foams are prepared by reacting an organic polyisocyanate with a polyol in the presence of a blowing agent and a catalyst(s). Polyester polyols of many types can be used as the polyol components in the production of these foams.

Because of the relatively high cost of typical polyols useful in making cellular polymers and because an inexpensive source of polyols is now available through the use of waste or scrap materials containing phthalic acid residues, efforts have heretofore been directed to processes for converting these materials to commercially useful polyester polyols. One such process is described in U.S. Pat. No. 3,647,759 and concerns transesterifying dimethyl terephthalate (DMT) process residue with ethylene glycol to form polyol reactants for reaction with polyisocyanate material in the production of polyurethane foams. The transesterification products of DMT process residue with ethylene glycol are unfortunately normally solid or balsamic, have limited compatibility with Freon 11 (trichlorofluoromethane blowing agent) and cannot be used as the sole polyol in Freon-blown foam systems unless special measures are taken to enhance their compatibility, such as the co-use of various compatibilizing agents.

U.S. Pat. No. 4,237,238 describes improved polyisocyanurate foam characterized by a high degree of fire resistance with low smoke evolution on combustion and low foam friability. The foam is obtained by bringing together in the presence of a blowing agent and trimerization catalyst an organic polyisocyanate and a polyol mixture prepared by the transesterification, with a glycol of molecular weight from about 60 to about 400, of the DMT process residue described in U.S. Pat. No. 3,647,759. Polyol mixtures of this type are available commercially from Hercules, Inc., Wilmington, Del. under the tradename Terate ® Resins. Unfortunately, it has been determined that these commercially available polyester polyols of U.S. Pat. No. 4,237,238 which are derived by transesterifying the residue with excess diethylene glycol also have poor compatibility with the fluorocarbon blowing agents. It has also been found that, when excess diethylene glycol is used in the transesterification reaction and left at levels of about 15 to 20% or more in the resultant polyester polyol, there is a degradation in the dimensional stability of urethane and low index isocyanurate foam made with the polyol.

Further, U.S. Pat. No. 4,346,229 describes how liquid aromatic polyester polyols having excellent shelf stability and compatibility with trichlorofluoromethane can be produced by reacting DMT process residue with an excess of dipropylene glycol. However, deficiencies have been encountered in the fluidity of these polyester polyols, leading to difficulties in employing them in foam production.

Thus, there still is a need in the art for an economical polyester polyol which does not have the aforementioned disadvantages.

OBJECTS OF THE INVENTION

It is accordingly an object of the present invention to provide a polyester polyol composition having a combination of advantageous properties, including a desirably low viscosity, good storage stability and compatibility with halohydrocarbon blowing agents, and a method of producing the polyol composition.

It is another object of the present invention to provide for use of the polyester polyol in producing polyisocyanurate and polyurethane foams having a combination of advantageous properties, including a reduced friability, high thermal resistance and compressive strength, and good dimensional stability.

It is a further object of the present invention to provide improved rigid cellular foams, especially polyisocyanurate and polyurethane foams, having a combination of advantageous properties, including a reduced friability, high thermal resistance and compressive strength, and good dimensional stability and insulation properties, and an improved method of producing the foams.

It is an additional object of the present invention to produce an improved rigid polyisocyanurate and an improved rigid polyurethane foam material, which are characterized by a high degree of fire resistance with low smoke evolution and flame spread on combustion, and the formation of a protective char over unburnt foam upon combustion.

It is a still further object of the present invention to provide closed cell polyisocyanurate and polyurethane foam materials which can be used in building panels which are highly insulating, thermally resistant, low in friability, soundproof and self-supporting.

DESCRIPTION OF THE INVENTION

The above objects have been achieved and the drawbacks of the prior art have been overcome by the development of improved polyester polyols whose use in the production of cellular foam significantly increases the dimensional stability of the foam. The polyester polyols of the invention are prepared by reacting polycarboxylic acids and/or acid derivatives with a mixture of polyols, the mixture of polyols containing a sufficient amount of a low equivalent weight glycol(s) to improve the dimensional stability of foams made therefrom.

The low equivalent weight glycol desirably is an alkylene glycol of the formula:

$$HO-R_1-OH \qquad (A),$$

wherein $R_1$ is a straight or branched chain alkylene group having about two to five carbon atoms, and is unsubstituted or substituted with one or more members selected from halogen, hydroxy, nitro, amino, etc. The alkylene group may not be interrupted by an oxygen or sulfur atom in the continuous chain of carbon atoms connected to the two hydroxy groups of formula (A). Preferred alkylene glycols of formula (A) are ethylene glycol and propylene glycol, with ethylene glycol being especially preferred. Another useful glycol of formula (A) is dibromo neopentyl glycol. These glycols may be used as is in producing the polyester polyols of the invention, or sources of the glycols, as, e.g., polyethylene terephthalate, may be added to the reaction mixture to generate the glycols during reaction.

The polyester polyols useful in the invention can be prepared by known procedures from a polycarboxylic acid or acid derivative, such as an anhydride or ester of the polycarboxylic acid, and a mixture of polyols containing the low equivalent weight glycol(s). Particularly suitable polyester polyols of the invention are aromatic polyester polyols containing phthalic acid residues.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester.

Besides the low equivalent weight glycols, any suitable polyhydric alcohol may be used in preparing the polyester polyols. These additional polyols can be aliphatic, cycloaliphatic, aromatic and/or heterocyclic, and are preferably selected from the group consisting of diols and triols. Aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used. Examples of especially suitable polyols for use in combination with the low equivalent weight glycols are higher alkylene glycols, such as diethylene glycol and/or a higher polyethylene glycol, dipropylene glycol and/or a higher polypropylene glycol, etc. The polyol component of the invention suitably comprises (a) at least one low equivalent weight alkylene glycol, (b) at least one higher alkylene glycol and (c) optionally at least one additional polyol.

The polyester polyols of the invention advantageously contain at least 1.8 hydroxyl groups and generally have an average equivalent weight of from about 75 to 500. Preferably, the polyesters contain from about 1.8 to 8 hydroxyl groups and have an average equivalent weight of from about 100 to 300, more preferably from about 120 to 250. Highly desirable aromatic polyester polyols of the invention have an average functionality of about 1.8 to 5, preferably about 2 to 2.5. Polyesters whose acid component advantageously comprises at least about 30% by weight of phthalic acid residues are particularly useful. By phthalic acid residue is meant the group

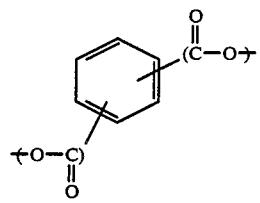

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic anhydride, (e) terephthalic acid, (f) residues from the manufacture of terephthalic acid, (g) isophthalic acid and (h) trimellitic anhydride. These compositions may be converted by reaction with the polyol mixtures of the invention to polyester polyols through conventional transesterification or esterification procedures.

While the polyester polyols can be prepared from substantially pure reactant materials, more complex ingredients are advantageously used, such as sidestream, waste or scrap residues from the manufacture of phthalic acid, terephthalic acid, dimethyl terephthalate, polyethylene terephthalate, adipic acid and the like. Suitable polyol side-stream sources include ethylene glycol, diethylene glycol, triethylene glycol and higher homologs or mixtures thereof. The similar homologous series of propylene glycols can also be used. Glycols can also be generated in situ during preparation of the polyester polyols of the invention by depolymerization of polyalkylene terephthalates. For example, polyethylene terephthalate yields ethylene glycol. Polyester polyols derived from raw materials containing compounds having the above defined phthalic acid residues constitute a preferred embodiment of the invention.

Preferred residues containing phthalic acid groups for reaction with the polyol mixture in accordance with the invention are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenyls. Dimethyl terephthalate may be present in amounts ranging from about 6 to 65% of the DMT process residue. Hercules, Inc., Wilmington, Del., sells DMT process residues under the trademark Terate® 101. Similar DMT process residues having a different composition but still containing the aromatic esters and acids are also sold by DuPont and others. The DMT process residues to be transesterified in accordance with the present invention preferably have a functionality at least slightly greater than 2.

One such suitable residue is the DMT residue disclosed in U.S. Pat. No. 3,647,759, the disclosure of which with respect to the residue is hereby incorporated by reference. This residue has been described as the residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. U.S. Pat. No. 3,647,759 describes in detail the residue set forth above and characterizes its properties.

Another suitable residue is disclosed in U.S. Pat. No. 4,411,949, the disclosure of which with respect to the residue is hereby incorporated by reference. This residue has been described as a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An especially useful by-product fraction from the manufacture of dimethyl terephthalate comprises a mixture of (a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

Alternatively, the terephthalic acid residue may comprise the product remaining after the removal of terephthalic acid from the mixture obtained by the oxidation of p-xylene in the preparation of terephthalic acid. This residue contains carboxyl groups which can be esterified by the polyol mixture of the invention.

Still other preferred phthalic acid residues for use in preparing the polyester polyols of the invention are polyalkylene terephthalate, especially polyethylene terephthalate (PET), residues or scraps. These residues provide a dual advantage because they furnish a source of ethylene glycol in the reaction mixture and the desirable phthalic acid residues.

The preferred glycols for use with the essential low equivalent weight glycols may be represented by the formula:

(B)

wherein R″ represents H or CH$_3$ with the proviso that both R″s cannot be CH$_3$ and x represents a number of from 2 to 10, preferably 2 to 4, and more preferably 2 to 3.

These higher glycols of formula (B) are especially useful in the transesterification and digestion of dimethyl terephthalate residues, PET scrap, phthalic anhydride bottoms, crude or light ends compositions, and the like. Additional glycol may be added after the transesterification and digestion procedures for appropriate adjustment of the equivalent weight. Examples of the higher alkylene glycols are diethylene glycol, dipropylene glycol, triethylene glycol, tetraethylene glycol, tripropylene glycol and tetrapropylene glycol, among others, and mixtures thereof. Especially suitable higher glycols are diethylene glycol, triethylene glycol, tetraethylene glycol, dipropylene glycol and tripropylene glycol. The polyol component used in preparing the polyester polyols of the invention advantageously includes sufficient triethylene glycol and/or a still higher equivalent weight alkylene glycol(s), especially dipropylene glycol and/or a higher polypropylene glycol(s), to increase the fluorocarbon solubility of the polyester polyol and preferably to result in a fluorocarbon solubility of at least 20 wt. % (wt. fluorocarbon/wt. fluorocarbon+wt. polyester polyol×100).

Preferred polyester polyols of this invention advantageously comprise (a) about 65 to 100%, preferably 70 to 95%, and more preferably 78 to 90%, by weight, of polyester polyol (especially aromatic polyester polyol), and
(b) about 0 to 35%, preferably 5 to 30%, and more preferably 10 to 22%, by weight, of alkylene glycols of formulas (A) and (B) defined above, wherein the weight ratio of low equivalent weight glycol(s): higher glycol(s) charged to the reaction mixture in the preparation of the polyester polyols is about 1:3 to 1:12.

The term "polyester polyol" as used in this specification and claims thus includes any minor amounts of unreacted polyol remaining after the preparation of the polyester polyol and/or unesterified polyol added after the preparation.

The digestion of waste or scrap residues, such as DMT residues, PET scrap, etc., to form polyester polyols in accordance with the invention can be gainfully performed by using a polycarboxylic acid component-containing polyol mixture. The polyols of the digesting medium must include the low equivalent weight glycol(s) and will additionally include one or more of the other polyols mentioned above as suitable for producing the polyester polyols of the invention. The polycarboxylic acid component of the digesting medium can be a polycarboxylic acid or acid derivative, such as an anhydride or ester of the polycarboxylic acid. Polycarboxylic acid components which are not esters before the reaction will be converted to esters during it.

A preferred polycarboxylic acid component-containing polyol comprises (a) at least one low equivalent weight alkylene diol of above formula (A),
(b) at least one higher alkylene diol of above formula (B),
(c) a mixture of monomers and oligomers having the formula:

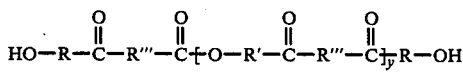

wherein each R and R' may be the same or different and represent (i) a radical of the formula:

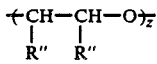

wherein R" represents H or CH₃, preferably H, with the proviso that both R"s cannot be CH₃, and z represents a number of from 0 to 10, preferably 0 to 4, if R is the radical and a number of from 1 to 10, preferably 1 to 4, if R' is the radical, and (ii) optionally a divalent radical of at least one additional dihydric alcohol, and wherein R''' represents an aromatic radical having from 6 to 12 carbon atoms, preferably phenylene, and wherein y represents a number of from 0 to 10, preferably 0 to 5, and more preferably 0 to 3, and (d) optionally at least one additional dihydric alcohol (e.g., cyclohexanedimethanol).

This polyol blend advantageously comprises from about 1 to 15, more preferably 1 to 10 percent by weight of the alkylene diol of formula (A); from about 30 to 80, more preferably 40 to 70 percent by weight of the higher alkylene diol of formula (B); from about 20 to 70, more preferably 30 to 60 percent by weight of polyester diol (c); and from about 0 to 10, more preferably 0 to 5 percent by weight of an additional dihydric alcohol(s).

In the preparation of particularly valuable polycarboxylic acid component-containing polyol mixtures of the invention, waste stream mixtures from processes for the production of linear polyesters from glycols and terephthalic acid are utilized. These waste-stream mixtures contain glycols, monomers and oligomers and are described in U.S. Pat. No. 4,100,354 whose teachings with respect to the mixtures are hereby incorporated by reference. The glycols of these mixtures include ethylene glycol, diethylene glycol, triethylene glycol and tetraethylene glycol.

U.S. Pat. No. 4,100,354 describes the ester portion of the mixtures, i.e., the monomers and the oligomers, as having the following formulas:

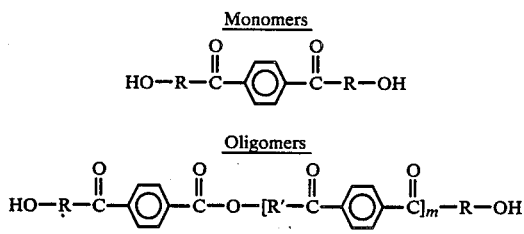

wherein m has a value within the range of from 1 to 3, R represents the group —[CH₂CH₂—O]ₙ and n has a value within the range of from 0 to 4 and R' represents the group [CH₂CH₂—O]ₓ and x has a value within the range of from 1 to 4.

These mixtures typically have a hydroxyl number within the range of from about 130 to about 900, preferably from about 250 to about 575, and more preferably from about 300 to about 550; and an acid number of from about 5 to about 430, preferably from about 5 to about 35.

These preferred ethylene glycol-containing mixtures of the invention are herein designated "MMG" and have the following typical composition:

| Mixed Glycols* and Monomers | | |
|---|---|---|
| Component | Composition | Normal Limits |
| Ethylene glycol | 12.0% | 18.0% maximum |
| Diethylene glycol | 8.0% | 20.0% maximum |
| Triethylene glycol | 4.0% | 10.0% maximum |
| Tetraethylene glycol | 4.0% | 10.0% maximum |
| Cyclohexanedimethanol | 10.0% | 20.0% maximum |
| Ash, wt. % | 0.2% | 0.3% maximum |
| Manganese ppm | 10.0 | 100.0 maximum |
| Water, wt. % | <1.0% | None |
| Acid number | 4.0 | None |
| Antimony, wt. % | <1.0% | None |
| EG monomer | 14.6% | None |
| DEG monomer | 10.7% | None |
| EG-DEG monomer | 4.3% | None |
| Mixed oligomer | 53.0% | None |

*Total glycol content (free and esterified glycol)

The waste-stream mixtures (e.g., "MMG") are suitably combined with an additional amount of glycol(s), e.g., higher glycol(s) such as dipropylene glycol and/or a higher polypropylene glycol, to provide highly desirable polycarboxylic acid component-containing polyol mixtures of the invention.

Another desirable polycarboxylic acid component for use in the polycarboxylic acid component-containing polyol has ring units with two

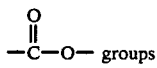

on adjacent (or ortho) or alternate (or meta) ring positions, and preferably has o-phthalic and/or isophthalic acid residues. Examples of ring residue-containing acid compounds are phthalic anhydride, isophthalic acid, tetrahydrophthalic anhydride, tetrachlorophthalic anhydride, tetrabromophthalic anhydride, 1,4,5,6,7,7-hexachloro-5-norbornene-2,3-dicarboxylic anhydride, and 1,8-naphthalic anhydride. Use of these ring residue-containing acid compounds is described in U.S. Pat. No. 4,539,341, whose disclosure is hereby incorporated by reference.

Yet another desirable polycarboxylic acid component for the polycarboxylic acid component-containing polyol has ring units with two

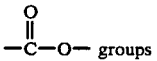

on adjacent (or ortho) ring positions and also ring units with two

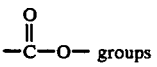

on alternate (or meta) ring positions. Preferred polyester polyols of desirably low viscosity can be produced from polycarboxylic acid components, especially aromatic polyacid components, having this mixture of ring units. The proportion of the ortho disubstituted to meta disubstituted ring units in the mixture can vary broadly, such as from about 10:1 to 1:10 weight %. Even when one of the ring unit types comprises only a relatively minor proportion (e.g., about 5-10% by weight) of the mixture, a significant reduction in polyol viscosity has been realized.

A preferred polycarboxylic acid component containing such a mixture of ring units is a complex by-product from DMT production which contains a high percentage of phenyl esters with ester groups in ortho or meta configurations. This polycarboxylic acid component is herein called "DMT isomeric by-product" and has the following approximate composition:

| Component | % By Weight |
|---|---|
|  | 18 ± 8 |
| 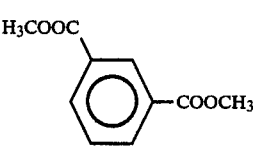 | 50 ± 10 |
| 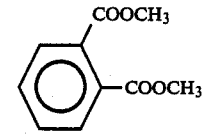 | 6 ± 2 |
| 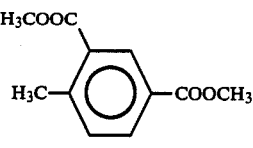 | 6 ± 2 |
| 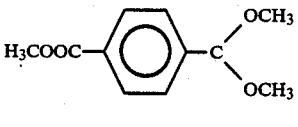 | 6 ± 2 |
| 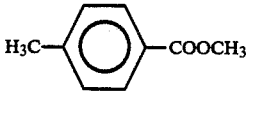 | 5 ± 3 |
| 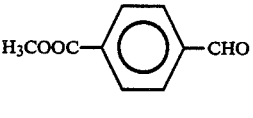 | 4 ± 3 |
| 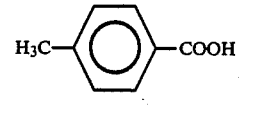 | 2 ± 1 |
| 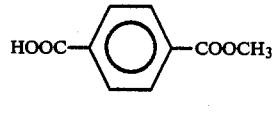 | 1 ± 0.6 |
| other aromatic compounds | 2 ± 1 |

This DMT isomeric by-product is used in the preparation of polyester polyol 13 of the invention (Example 6 below). The disclosure of U.S. application Ser. No. 797,303, filed Nov. 12, 1985, now U.S. Pat. No. 4,652,591, with respect to the above ring residue-containing acid compounds is hereby incorporated by reference.

In the preferred embodiment of the present invention involving the digestion of the waste or side-stream phthalic acid residues-containing materials (e.g., DMT process residues and/or PET scrap), the digestion is conveniently carried out under normal transesterification or esterification conditions well known and described in the prior art. Illustratively, the reaction can be conducted in the absence of a liquid reaction medium composed of material other than the transesterifying or esterifying ingredients, i.e., the low equivalent weight glycol-containing polyol mixtures, and phthalic acid residues-containing material. The polyester polyols of the invention can be made by separately preparing a polyester polyol derived from the low equivalent weight alkylene glycol(s) and a polyester polyol derived from the higher alkylene glycol(s), but generally a mixture of the low equivalent weight glycol(s) and higher glycol(s) is reacted with the phthalic acid residues-containing material. The reaction suitably is performed under a flow of nitrogen and at atmospheric, subatmospheric or superatmospheric pressure and temperatures from about 150° C. to about 250° C. for a period from about one hour to about ten hours. Reaction is considered to be substantially complete when the formation of distillate ceases. While reaction is taking place, distillate formed preferably is removed from the reaction vessel. The reaction can be carried out as a batch process or continuously.

The reaction is normally catalyzed. The waste or side-stream material itself may contain an effective amount of catalyst to promote the present reaction. However, if such a catalyst is not present or not enough of it is present, enough catalyst is added to the reaction mixture to suitably promote the reaction. Any conventional transesterification or esterification catalyst (single compound or mixture of compounds) can be used.

After transesterification or esterification, the reaction product can be reacted with an alkylene oxide to form an aromatic polyester polyol mixture of the invention. This reaction desirably is catalyzed. The temperature of this process should be from about 80° to 170° C., and the pressure should generally range from about 1 to 40 atmospheres.

Although the resultant aromatic polyester polyol mixture of the invention can be employed without being filtered, it is often desirable to filter the mixture prior to its subsequent utilization, such as in foam preparations. Alternatively, the waste or side-stream material can be filtered before it is reacted. Metal salt removal is effected by the filtration.

In one embodiment of the invention, the phthalic acid residues-containing material, polycarboxylic acid component-containing polyol and catalyst are introduced together to the reactor and thereafter reacted. This method has been found effective when the above "DMT isomeric by-product" of the invention is used as the polycarboxylic acid component. According to another embodiment of the invention, the acid component, such as phthalic anhydride, and the polyol component, such as ethylene glycol and diethylene and/or dipropylene glycol, are reacted first in the presence of the catalyst, such as tetraisopropyl titanate, to form a polyester polyol. Then the phthalic acid residues-containing material is added and the process is continued.

The proportions of waste or side-stream material to polyols to optional acid or derivative thereof—when the above-described digesting polycarboxylic acid component-containing polyol is employed—may be varied to a considerable degree in accordance with the product desired. At all events, sufficient polyol and acid component should be employed to form a polyester polyol having a readily usable viscosity, such as below 40,000 cps at 25° C., and capable of efficiently polymerizing with organic polyisocyanates in the formation of rigid foams.

The saponification number (a measure of transesterification sites) of waste or side-stream materials, like the DMT process residue, should be considered in selecting reaction proportions. Similarly, the acid number is used in determining reaction proportions for the carboxyl functional residues of the invention. Suitable proportions of reactants in the transesterification or esterification may be as follows:

Equivalents ratio of total polyol component [e.g., ethylene glycol+another glycol(s) selected from the group consisting of diethylene glycol, triethylene glycol, tetraethylene glycol, dipropylene glycol, tripropylene glycol and mixtures thereof] to total acid component [waste or side-stream material+any other acid component]=1.2:1 to 3.5:1, preferably 1.4:1 to 2.5:1.

The properties of the polyester polyol mixtures of the present invention fall within rather broad ranges because of the complexity and variable nature of the phthalic acid residues-containing materials themselves. Accordingly, the viscosities (Brookfield) of the polyol mixtures measured in cps. at 25° C. fall within a rather broad range from about 500 to about 500,000, preferably about 500 to about 50,000, and most preferably about 2000 to about 40,000; the hydroxyl number values fall within a range of from about 150 to about 950, preferably about 230 to about 650, and most preferably from about 260 to about 510; the acid number falls within a range of from about 0.2 to about 40 and preferably about 0.2 to about 10. The hydroxyl number can be defined by the equation:

$$OH = \frac{56.1 \times 1000 \times f}{M.W.}$$

wherein
OH=hydroxyl number of the polyol;
f=average functionality, that is, average number of hydroxyl groups per molecule of polyol;
M.W.=average molecular weight of the polyol.

The transesterifying or esterifying polyol component (e.g., ethylene and/or propylene glycol+at least one higher glycol) is preferably employed in excess in the reaction so that at the end of the reaction there is an excess of transesterifying or esterifying polyol remaining in the polyol mixture of the invention. This residual polyol can vary broadly but advantageously falls within a range of from 5 to 35, preferably 8 to 25, percent by weight of the polyol mixture. Excess polyol can be distilled from the transesterified or esterified polyol mixture for appropriate adjustment of viscosity and equivalent weight. Advantageously, the distillation is conducted to yield a polyester polyol as above described, e.g., preferably having a viscosity of about 500 to 40,000 cps. and a hydroxyl number of about 230 to 650.

Most preferred polyester polyol mixtures of the invention employing ethylene glycol and at least one higher glycol as transesterifying or esterifying agent are characterized by a viscosity in cps. at 25° C. of about 2,000 to about 40,000, a free glycol content of from about 10 to about 22 percent by weight of said mixture, a hydroxyl number within a range of from about 275 to about 400, and an acid number of about 0.2 to about 10.

Although the polyol mixtures of this invention can be readily produced as fluid materials, particularly by employing excess glycol transesterifying or esterifying agent and leaving residual glycol in the mixtures, additional diluents can be employed with the polyol mixtures. Inert diluents can be employed, but it is usually preferred to employ liquid polyols. Therefore, diols such as diethylene glycol or dipropylene glycol, or other suitable polyols may be added in a later step to beneficially modify the polyol mixtures, e.g., to reduce their viscosity.

For purposes of viscosity reduction, these diluents are generally employed in only minor amounts, as, e.g., in the range of about 1 to 40 percent, preferably about 5 to 30 percent, by weight of the polyol mixture. However, it is also within the scope of the present invention to form polyol mixtures wherein the transesterifying or esterifying polyol and any subsequently added polyol are present in greater amounts. The content of transesterifying or esterifying and optionally added polyol in the mixture can be progressively increased to the point where they are the major component and the transesterified or esterified mixture of the invention is present in only minor amount, as, e.g., in the range of about 1 to 20 percent by weight of the transesterifying or esterifying and optionally added polyol.

Generally speaking, polyester polyols prepared in accordance with the prior art are made from DMT bottoms, scrap PET, phthalic anhydride, and the like by reaction with a glycol such a diethylene or dipropylene glycol. The specific glycols are used in excess to make a liquid product. Unless specific procedures, including vacuum stripping, are undertaken, the polyol has a high free glycol content, e.g., 14–20%, which results in a degradation of dimensional stability in foam made with the polyol. Applicants have found that by instead using glycols such as ethylene or propylene glycol or sources of these glycols in combination with a higher equivalent weight glycol, such as diethylene or dipropylene glycol, the resultant polyols made from phthalic acid residues-containing material, e.g., DMT bottoms, bring about, when reacted with isocyanate to form foam, an improvement in the foam's dimensional stability. This improvement is attained despite the fact that applicants' polyester polyols can contain as much free glycol as the prior art diethylene or dipropylene glycol-based polyols.

Polyester polyols of the present invention made from a polyol component containing dipropylene glycol and/or a higher polypropylene glycol(s) also are superior in fluorocarbon solubility to their diethylene glycol-based counterparts. The high fluorocarbon compatibility of polyester polyols of this invention makes them eminently suitable for inclusion in the B-component (premix) commonly used in the manufacture of cellular foam materials. It is possible to dissolve high levels of fluorocarbon in applicants' polyester polyols—e.g., 29 to 39 weight % fluorocarbon, based on the total weight of fluorocarbon and polyester polyol. The fluorocarbon-containing premixes also can include other conventional polyols of the type conventionally used in making rigid polyurethane or polyisocyanurate foams (e.g., a polyether polyol of functionality greater than 2), and other additives customarily used in foam production, such as catalysts, flame retardants, etc. Selection of the particular ingredients and proportions to use in these fluorocarbon-containing premixes are well within the knowledge of those skilled in the art.

The polyester polyols of the present invention may be used in the preparation of both cellular and non-cellular polymers. The latter polymers, such as the polyisocyanurates and polyurethanes, can be prepared by using standard techniques known to those skilled in the art. The polyester polyols are particularly useful in the preparation of polyisocyanurate foams and polyurethane foams. In an advantageous embodiment of the invention, the polyester polyols are employed in admixture with at least one other polyol in the production of these foams, especially the polyurethane foams. The polyisocyanurate and polyurethane foams can be prepared by mixing together the organic polyisocyanate with the polyol, catalyst and blowing agent at temperatures ranging from about 0° C. to 150° C.

The polyurethane foams can be prepared by reacting the polyester polyol of the invention and polyisocyanate on an essentially 1:1 to 1:1.2 equivalent basis. In the embodiment wherein the polyester polyols of the invention are combined with another polyol(s) to produce polyurethane foams, the polyester polyols of the invention can comprise about 5 to 100, preferably about 5 to 75, and more preferably about 20 to 50, weight percent of the total polyol content in the foam preparations. The polyisocyanurate foams of the invention are prepared by reacting the polyisocyanate with a minor amount of polyol, such as sufficient polyol to provide about 0.10 to 0.55 hydroxyl equivalents of polyol per equivalent of said polyisocyanate, wherein the polyester polyol of the invention comprises about 5 to 100, and preferably about 50 to 100, weight percent of the total polyol content in the foam preparations.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2, 4-diisocyanate, toluene-2,6-diisocyanate, mixtures of 2,4- and 2,6-toluene diisocyanate, hexamethylene-1,6-diisocyanate, tetramethylene-1, 4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl4,4'biphenyldiisocyanate, and 3,3'-dimethyldiphenylmethane-4,4'-diisocyanate; the triisocyanates such as 4,4',4"-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

The preferred polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

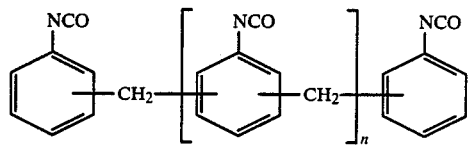

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6-21. It should, therefore, be understood that the polymethylene polyphenylisocyanates available on the market under the trade-names of CODE 047 or PAPI-20 (Upjohn) and MR 200 (Mobay) can successfully be employed within the spirit and scope of the present invention.

In order to ensure complete reaction of isocyanurate foams, the polymethylene polyphenylisocyanate and the polyol are generally mixed in an equivalent ratio of 1.5:1 to 6:1 and preferably 2:1 to 5:1. In ranges outside these proportions the reaction tends to yield a product having less desirable physical characteristics.

The polyols which can be employed in combination with the polyester polyols of the invention in the preparation of the polyurethane and polyisocyanurate foam compositions include monomeric polyols and polyether polyols other than those included under formulas (A) and (B) above. These other polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2-8, and more preferably has a functionality of 3 or greater (e.g., 4-8).

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. The polyether polyols generally have an average equivalent weight from about 70 to 10,000 and preferably have an average equivalent weight from about 100 to about 6000. Polyoxypropylene glycols having molecular weights from about 200 to about 4000 corresponding to equivalent weights from about 100 to 2000 and mixture thereof are particularly useful as polyol reactants. Polyol blends such as a mixture of high molecular weight polyether polyols with lower molecular weight polyether polyols can also be employed.

Any blowing agent (e.g., water) typically employed in similar prior art foam products containing polyisocyanurate and/or polyurethane linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons.

The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the total foam-forming composition. When the blowing agent has a boiling point at or below ambient, it is maintained under pressure until mixed with the other components. Alternatively, it can be maintained at subambient temperatures until mixed with the other components.

A particularly advantageous feature of this invention is that halogenated organic, especially fluorocarbon, blowing agents are highly compatible with applicants' aromatic polyester polyols derived from dipropylene glycol and/or higher polypropylene glycol-containing polyol components. Compatibility between the polyol and fluorocarbon blowing agent components employed in manufacturing rigid polyisocyanurate and polyurethane foam is sufficiently high that with normal production techiques as much as about 40 to 95 weight % of the polyol may be aromatic polyester polyol. This allows full advantage to be taken of the tendency of the aromatic polyester polyol to produce rigid foams of low friability, k-factor, flammability and cost.

The fluorocarbon blowing agent can be any of the fluorocarbons known to those skilled in the art as useful for blowing polymer mixtures into foams. In general, these blowing agents have an atmospheric pressure boiling point between minus 50 and 100° C. and preferably between zero and 50° C. Such blowing agents can be, if desired, substituted by chlorine and/or bromine in addition to the fluorine content. A preferred class of fluorocarbons are the fluorinated alkanes. Examples of fluorocarbon blowing agents are trichlorofluoromethane, monochlorodifluoromethane, dichlorodifluoromethane, dichloromonofluoromethane, $CCl_2FCClF_2$ and $CCl_2FCF_3$. Mixtures of fluorocarbon blowing agents can be employed. Trichlorofluoromethane is a preferred blowing agent.

The particular fluorocarbon and polyols and percentages of each to be employed in any specific polyol blend of the invention for maximum miscibility can be easily determined by one skilled in the art by a process of trial and error. In accordance with the present invention, there may be obtained miscible blends comprising from at least about 10, preferably 25, percent by weight to about 50, preferably 35, percent by weight of fluorocarbon blowing agent and correspondingly from about 90, preferably 75, percent by weight to about 50, preferably 65, percent by weight of polyol components.

Any suitable surfactant can be employed in the foams of this invention. The surfactant may be included in the polyol/fluorocarbon blend. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

Any of the catalysts conventionally employed in the art to catalyze the reaction of an isocyanate with a reactive hydrogen containing compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1, 3,3-tetramethylguanidine, N,N,N',N'-tetramethyl-1,3-butanediamine, N,N-dimethylethanolamine, N,N-diethylethanolamine, and the like. In a preferred embodiment of the invention, the polyol/fluorocarbon blend additionally includes the catalyst(s). The catalysts generally comprise from about 0.1 to 20, and preferably from 0.3 to 10, weight percent of the total foam-forming composition.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol (sold by Rohm and Haas Co. under the designation "DMP-30"), and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896.

Other additives may also be included in the foam formulations. Included are nonreactive and reactive flame retardants, such as tris(2-chloroethyl)-phosphate, dispersing agents, plasticizers, fillers and pigments. Minor amounts (typically less than about 15 wt. %) of these additives can be included in the polyol/fluorocarbon blend of the invention.

The present invention also provides a process for producing a laminate which comprises (a) contacting at least one facing sheet with a foam-forming mixture comprising an organic polyisocyanate, a blowing agent, a catalyst and the polyol composition, and (b) foaming the foam-forming mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

The invention is further illustrated by the following examples in which all parts and percentages are by weight unless otherwise indicated.

EXAMPLE 1

This example illustrates (A) the preparation of aromatic polyester polyols by transesterifying dimethyl terephthalate (DMT) process residues with either (a) diethylene glycol (DEG) or (b) a combination of DEG with either ethylene glycol (EG) or a source of EG, viz., polyethylene terephthalate (PET) scrap, and (B) the use of the aromatic polyester polyols in the synthesis of polyurethane foams.

(A) TRANSESTERIFICATION WITH GLYCOL(S)

The preparation of Polyol Nos. 1 to 3 of Table I(A) below was initiated by placing the listed quantities (pbw) of the ingredients in a resin kettle equipped with a stirrer, thermometer and distillation head. The ingredients then were brought to 225° C. and held at this temperature for 2 hours. During this time, methanol and water were distilled from the reaction mixture. After 2 hours at 225° C., distillation ceased and the product was cooled to ambient temperature.

Characteristics of the aromatic polyester polyols produced are shown in Table I(A).

(B) SYNTHESIS OF POLYURETHANE FOAMS

Polyol Nos. 1 to 3 and a comparative polyol, Terate 203, were used in the preparation of polyurethane foams of 115 index.

In the foam syntheses, the following quantities of the following ingredients were combined as indicated:

| Item | Ingredient | Quantity (pbw) |
|---|---|---|
| A | Sucrose amine polyol[1] | 42.25 |
| B | Polyether polyol[2] | 32.45 |
| C | Diethyl bis(2-hydroxyethyl) aminomethyl phosphonate[3] | 15.00 |
| D | Aromatic polyester polyol [See Table I(a)] | 89.70 |
| E | Silicone surfactant[4] | 3.5 |
| F | N,N—dimethylcyclohexylamine[5] | 0.2 |
| G | R-11B | 66.70 |
| H | Polymethylene polyphenyl isocyanate[6] | wt. to provide 115 index |

[1]Item A is that supplied by Olin Corporation under the trade name Poly G 71-530.
[2]Item B is that supplied by Dow Chemical Company under the trade name Voranol RA-800.
[3]Item C is a flame retardant supplied by Stauffer Chemical Corporation under the trade name Fyrol 6.
[4]Item E is that supplied by Dow Corning Corporation under the trade name DC193
[5]Item F is an amine catalyst supplied by Air Products and Chemicals, Inc. under the trade name Polycat 8.
[6]Item H is a polymethylene polyphenyl isocyanate having a viscosity of 150-250 centipoises at 25° C. and is available from Mobay Chemical Corporation under the trade name Mondur MR.

In each foam preparation, a premix of Items A, B, C, D amd G at 15° C. was poured into a reaction vessel. Items E and F at ambient temperature were then added to the vessel, and all ingredients were mixed at 1000 rpm for ca. 10 seconds. Lastly, Item H at ambient temperature was added to the vessel and all ingredients were mixed at 3500 rpm for 15 seconds, and thereafter poured into a box to yield a rigid polyurethane foam.

Characteristics of the foams produced are shown in the following Table I (B).

The results presented in Table (B) demonstrate that Polyol Nos. 1 to 3 give foams whose properties are comparable to or better than those of the foam made with Terate 203.

TABLE I

| POLYOL NO. | 1 | 2 | 3 | Terate 203[2] |
|---|---|---|---|---|
| A. TRANSESTERIFIED POLYOL MIXTURES | | | | |
| DMT Process Residue[1] | 276 | 480 | 480 | |
| DEG | 331 | 352.8 | 293.6 | |
| EG | — | 39.2 | 73.4 | |
| PET[3] | 204 | — | — | |
| Tetraisopropyltitanate | 1 | 1 | 1 | |
| Brookfield Viscosity (cps) | 26,800 | 48,800 | 84,800 | 20,000 |
| OH No. | 313 | 323 | 329 | 321 |
| Eq. Wt. | 179 | 174 | 171 | 175 |
| Residual Glycol (%) | 13.1 | 14.8 | 13.8 | 9 |
| B. FOAM PROPERTIES | | | | |
| Cream Time (sec) | 27 | 29 | 25 | 24 |
| Gel Time (sec) | 70 | 68 | 67 | 68 |
| Firm Time (sec) | 85 | 85 | 80 | 82 |
| Tack Free Time (sec) | | 125 | | |
| Density (pcf) | 1.86 | 1.91 | 1.90 | 1.87 |
| K-Factor[4], | | | | |
| 1 day | .131 | .132 | .127 | .135 |
| 30 days | .150 | .139 | .142 | .142 |
| Dimensional Stability[5], % Δ V max, 28 days | | | | |
| 70° C./95% R.H. | 29 | 25 | 23 | 29 |
| 110° C. | 38 | 33 | 32 | 38 |

[1]Residue = Terate 101 having acid number of 23.8 and saponification number of 535 (Hercules, Inc.).
[2]Terate 203 = Polyester polyol prepared by transesterification with an excess of diethylene glycol of the residue of a dimethyl terephthalate esterified oxidate reaction product.
[3]PET = Polyethylene terephthalate bottle scrap (E. I. du Pont de Nemours, Inc.).
[4]Units = Btu-in/hr-ft²-°F.
[5]According to ASTM Test Method D-2126.

EXAMPLE 2

This example illustrates the preparation of aromatic polyester polyols by transesterifying DMT process residues with either (a) DEC or (b) a combination of DEG and a by-product stream of mixed monomers and glycols (MMG) which include EG.

The preparation of Polyol Nos. 4 to 8 of Table II below was initiated as in Example 1. The data of Table II show the temperature at which the onset of distillation occurred and other pertinent data relating to the synthesis of the polyols. The partial substitution of MMG for the DMT process residue is found to result in the collection of substantially less distillate and thus an increase in the yield of polyol.

Table II also shows various physical properties of the resultant polyols.

TABLE II

| TRANSESTERIFIED POLYOL MIXTURES | | | | | |
|---|---|---|---|---|---|
| POLYOL NO. | 4 | 5 | 6 | 7 | 8 |
| DMT Process Residue[1] | 415 | — | — | 480 | — |
| DMT Process Residue[2] | — | 268.7 | 268.7 | — | 318.6 |
| MMG | — | 268.7[3] | 268.7[4] | — | 318.6[3] |
| DEG | 560 | 365 | 365 | 440 | 263 |
| Tetraisopropyltitanate | 1 | 1 | 1 | 1 | 1 |
| Distillation Onset (°C.) | 164 | 182 | 184 | 178 | 185 |
| Time From Onset to 225° C. (hrs) | 0.77 | 0.75 | 0.92 | 0.50 | 0.63 |
| Distillate Collected, Arrival at 225° C. (%) | 90.9 | 95.2 | 91.4 | 88.8 | 88.1 |
| Distillate Collected, 1 hr. at 225° C. (%) | 97.5 | 100 | 98.6 | 99.3 | 97.6 |
| Total Distillate, 2 hr. at 225° C. (ml) | 121 | 63 | 70 | 153 | 84 |
| Polyol Yield (%) | 90.1 | 94.4 | 93.8 | 86.7 | 92.5 |
| Brookfield Viscosity at 25° C. (cps) | 3330 | 1960 | 1800 | 49,800 | 19,600 |
| OH No. | 452 | 449 | 462 | 279 | 329 |
| Eq. Wt. | 124 | 125 | 121 | 201 | 170 |

[1]Residue has acid number of 64.4, saponification number of 484.5 and DMT content of 11.9%.
[2]Residue is defined in footnote 1 of Table I.
[3]Mixed Monomers and Glycols from Eastman Chemical Products, Inc., Kingsport, Tennessee.
[4]Mixed Monomers and Glycols from Eastman Chemical Products, Inc., Columbia, South Carolina.

EXAMPLE 3

This example illustrates the synthesis of polyisocyanurate foams (14% trimer) utilizing aromatic polyester polyols of the invention and a comparative aromatic polyester polyol.

In each foam synthesis, the following quantities of the following ingredients were combined as indicated:

| Item | Ingredient | Quantity (pbw) |
|---|---|---|
| A | Polymethylene polyphenylisocyanate[1] | 223 |
| B | R-11B | 55 |
| C | Silicone surfactant[2] | 3.5 |
| D | Aromatic polyester polyol (See Table III) | 77 |
| E | Catalyst[3] | (See Table III) |

[1]Isocyanate having an equivalent weight of 138, an acidity of 0.03% HCl, and a viscosity of 2000 cps at 25° C.
[2]Surfactant = Y-10222 (Union Carbide Corp.).
[3]Catalyst = Blend of DMP-30:potassium-2-ethyl hexoate:diethylene glycol in a 1:4.2:7.8 weight ratio.

A mixture of Items A and B, at a temperature of 15° C., was poured into a reaction vessel. Items C and D were then added to the vessel, and all ingredients were mixed at 3600 rpm for 5 seconds. Item E was then mixed into the contents of the vessel over a 5 second interval. All ingredients were thereafter mixed at 3600 rpm for an additional 7 seconds and then poured into a box, yielding a polyisocyanurate foam.

Characteristics of the foams produced (Foams A–C) are shown in the following Table III.

The results presented in Table III demonstrate that polyols made with the MMG-DMT bottoms combination give foams equivalent in physical properties to those made with the comparative polyester polyol.

TABLE III

| EVALUATION OF POLYOLS IN POLYISOCYANURATE FOAMS | | | |
|---|---|---|---|
| | FOAM | | |
| | A | B | C |
| Polyester Polyol Utilized | Polyol No. 5[1] | Polyol No. 6[1] | Comparative Polyol[2] |
| Catalyst Wt. (pbw) | 6.1 | 5.7 | 8.7 |
| Cream Time (sec) | 18 | 19 | 24 |
| Gel Time (sec) | 32 | 38 | 38 |
| Firm Time (sec) | 36 | 44 | 42 |
| Tack Free Time (sec) | 45 | 55 | 48 |
| Density (pcf) | 1.69 | 1.69 | 1.69 |
| K-Factor[3], | | | |
| 1 day | .128 | .130 | .136 |
| 30 days | .146 | .146 | .151 |
| Friability[4] (% wt. loss) | 8.4 | 8.2 | 17.1 |
| Oxygen Index[5] | 23.9 | 23.9 | 23.8 |
| % Δ V max[6], | | | |
| 28 days at 70° C./95% R.H. | 12 | 13 | 11 |
| 28 days at 110° C. | 9 | 10 | 7 |

[1]Of Example 2.
[2]Prepared from 415 pbw DMT process residue (Terate 101), 520 pbw DEG and 1 pbw tetraisopropyltitanate according to the procedure utilized for Polyol No. 4 of Example 2. Brookfield viscosity at 25° C. = 2,480 cps; hydroxyl number = 445; equivalent weight = 126; and residual DEG - 28.2%.
[3]Units = Btu-in/hr-ft[2]-°F.
[4]According to ASTM Test Method C-421.
[5]Flammability test conducted according to ASTM D-2863-70, except that a sample measuring ½" × ½" × 6" was used.
[6]According to ASTM Test Method D-2126.

EXAMPLE 4

This example illustrates the synthesis of polyisocyanurate foam (10% trimer) utilizing aromatic polyester polyols of the invention and a comparative aromatic polyester polyol (Terate 203).

The foam syntheses were conducted according to the procedure of Example 3 utilizing the following quantities of the following ingredients:

| Item | Ingredient | Quantity (pbw) |
|---|---|---|
| A | Polymethylene polyphenylisocyanate[1] | (See Table IV) |
| B | R-11B | " |
| C | Silicone surfactant[2] | 3.5 |
| D | Aromatic polyester polyol | (See Table IV) |

-continued

| Item | Ingredient | Quantity (pbw) |
|---|---|---|
| E | Catalyst[3] | (See Table IV) |

[1]Isocyanate = Mondur MR-200 having an equivalent weight of 138, an acidity of 0.03% HCl, and a viscosity of 2000 cps at 25° C. (Mobay Chemical Corp.).
[2]Surfactant = Y-10222 (Union Carbide Corp.)
[3]Catalyst = Blend of DMP-30:potassium-2-ethyl hexoate:diethylene glycol in a 1:4.2:7.8 weight ratio.

Characteristics of the foams produced (Foam A-C) are shown in the following Table IV.

The results presented in Table IV show that the foams made with the MMG-DMT bottoms based polyols are at least equivalent to the foam made with Terate 203 and seem to have better flammability properties as evidenced by the higher oxygen index.

TABLE IV
EVALUATION OF POLYOLS IN POLYISOCYANURATE FOAMS

| | FOAM | | |
|---|---|---|---|
| | A | B | C |
| Polyester Polyol Utilized | Polyol No. 8[1] | Polyol No. 9[2] | Terate 203[3] |
| Polyester Polyol Wt. (pbw) | 111 | 111 | 110 |
| Isocyanate Wt. (pbw) | 189 | 189 | 190 |
| R-11B Wt. (pbw) | 40 | 40 | 48 |
| Catalyst Wt. (pbw) | 6.2 | 6.8 | 10 |
| Cream Time (sec) | 15 | 14 | 30 |
| Gel Time (sec) | 28 | 24 | 52 |
| Firm Time (sec) | 30 | 26 | 55 |
| Tack Free Time (sec) | 38 | 33 | 68 |
| Density (pcf) | 2.01 | 1.99 | 1.75 |
| K-Factor[4], | | | |
| 1 day | .118 | .116 | — |
| 30 days | .128 | .126 | — |
| Friability[5] (% wt. loss) | 2 | 2 | — |
| Oxygen Index[6] | 23.1 | 23.2 | 22.75 |
| % Δ V max[7], | | | |
| 28 days at 70° C./95% R.H. | 16 | 13 | 16 |
| 28 days at 110° C. | 14 | 11 | 16 |

[1]Of Example 2.
[2]Prepared from 318.6 pbw DMT process residue (Terate 101), 318.6 pbw MMG, 246 pbw DEG and 1 pbw tetraisopropyltitanate according to the procedure utilized for Polyol No. 8 of Example 2. Brookfield viscosity at 25° C. = 23,800 cps; hydroxyl number = 327; and equivalent weight = 171.
[3]Terate 203 is defined in footnote 2 of Table I.
[4]Units = Btu-in/hr-ft$^2$-°F.
[5]According to ASTM Test Method C-421.
[6]Flammability test conducted according to ASTM D-2863-70, except that a sample measuring ½" × ½" × 6" was used.
[7]According to ASTM Test Method D-2126.

EXAMPLE 5

This example illustrates the synthesis of polyurethane foams of 115 index utilizing aromatic polyester polyols of the invention (Polyol Nos. 8 and 9) and comparative aromatic polyester polyols.

The foam syntheses were conducted according to the procedure of Example 1 utilizing the ingredients and quantities thereof presented in Example 1 except that the aromatic polyester polyols employed were those listed in Table V below.

Various characteristics of the polyurethane foams produced (Foams A-D) are shown in Table V below.

The foam properties presented in Table V demonstrate that the polyols made from the MMG-DMT bottoms give foam that is comparable to that made from Terate 203 and significantly better than that made from the other comparative polyol.

TABLE V
EVALUATION OF POLYOLS IN POLYURETHANE FOAMS

| | FOAM | | | |
|---|---|---|---|---|
| | A | B | C | D Comparative |
| Polyester Polyol Utilized | Polyol No. 8[1] | Polyol No. 9[2] | Terate 203[3] | Polyol[4] |
| Cream Time (sec) | 18 | 19 | 23 | 23 |
| Gel Time (sec) | 56 | 52 | 46 | 71 |
| Firm Time (sec) | 68 | 66 | 76 | 82 |
| Tack Free Time (sec) | 90 | 93 | 105 | — |
| Density (pcf) | 1.87 | 1.88 | 1.89 | 1.82 |
| K-Factor[5], | | | | |
| 1 day | .130 | .126 | .131 | .134 |
| 30 days | .142 | .140 | .144 | .147 |
| % Δ V max[6], | | | | |
| 28 days at 70° C./95% R.H. | 29 | 29 | 31 | 40 |
| 28 days at 110° C. | 42 | 40 | 43 | 55 |

[1]Of Example 2.
[2]Of Example 4.
[3]Terate 203 is defined in footnote 2 of Table I.
[4]Prepared from 480 pbw DMT process residue (Terate 101), 420 pbw DEG and 2 pbw Mn(OAc)$_2$.4H$_2$O according to the procedure utilized for Polyol Nos. 1-3 of Example 1.
[5]Units = Btu-in/hr-ft$^2$-°F.
[6]According to ASTM Test Method D-2126.

EXAMPLE 6

This example illustrates the preparation of (a) additional aromatic polyester polyols based on the by-product stream of mixed monomers and glycols (MMG) and (b) comparative aromatic polyester polyols having corresponding viscosities.

The polyols of Table VI below were prepared from the listed quantities (pbw) of the ingredients according to the procedure utilized for Polyol Nos. 1-3 of Example 1. Characteristics of the aromatic polyester polyols produced are shown in Table VI.

TABLE VI

TRANSESTERIFIED POLYOL MIXTURES

| POLYOL | DMT PROCESS RESIDUE[1] | PA | ISOMERS[2] | MMG[3] | DEG | TPT[4] | BROOKFIELD VISCOSITY (cps) | EQ. WT. |
|---|---|---|---|---|---|---|---|---|
| No. 10 | 240 | 60 | — | 180 | 290 | 1 | 10,240 | 168 |
| No. 11 | 240 | 120 | — | 120 | 348 | 1 | 12,860 | 183 |
| A (Comparative) | 5448 | — | 5448 | — | 9080 | 22 | 8,470 | 181 |
| No. 12 | 127 | 212 | — | 142 | 419 | 1 | 2,980 | 160 |
| No. 13 | 106 | — | 254.4 | 169.6 | 357 | 1 | 4,950 | 167 |
| No. 14 | 240 | 120 | — | 120 | 380 | 1 | 6,500 | 165 |
| B (Comparative) | 72 | — | 408 | — | 490 | 1 | 3,200 | 180 |

[1]Residue is defined in footnote 1 of Table I.
[2]DMT isomeric by-product (ISOMERS) has the composition shown above in the description of the invention.
[3]MMG is defined in footnote 3 of Table II.
[4]Catalyst is tetraisopropyltitanate.

EXAMPLE 7

This example illustrates the synthesis of polyisocyanurate foams (10% trimer) utilizing aromatic polyester polyols of the invention (Polyol Nos. 10 and 11 of Example 6) and a comparative aromatic polyester polyol.

The foam syntheses were conducted according to the procedure of Example 3 utilizing the following quantities of the following ingredients:

| Item | Ingredient | Quantity (pbw) |
|---|---|---|
| A | Polymethylene polyphenylisocyanate[1] | (See Table VII) |
| B | R-11B | 45 |
| C | Silicone surfactant[2] | 3.5 |
| D | Aromatic polyester polyol | (See Table VII) |
| E | Catalyst[3] | (See Table VII) |

[1]Isocyanate = Mondur MR-200 having an equivalent weight of 138, an acidity of 0.03% HCl, and a viscosity of 2000 cps at 25° C. (Mobay Chemical Corp.).
[2]Surfactant = Y-10222 (Union Carbide Corp.).
[3]Catalyst = Solution of potassium octoate:potassium acetate:DMP-30:DEG in a 2.31:1.18:0.69:5.82 weight ratio.

Characteristics of the foams produced are shown in the following Table VII.

As shown in Table VII, foams made from the MMG containing polyols are equal or superior in dimensional stability to those made from the comparative polyol.

TABLE VII

EVALUATION OF POLYOLS IN POLYISOCYANURATE FOAMS

| | FOAM | | |
|---|---|---|---|
| Polyester Polyol Utilized | A Polyol No. 10[1] | B Polyol No. 11[1] | C Comparative Polyol A[1] |
| Polyester Polyol Wt. (pbw) | 110 | 115 | 114 |
| Isocyanate Wt. (pbw) | 190 | 185 | 186 |
| Catalyst Wt. (pbw) | 6.5 | 7.8 | 6.5 |
| Cream Time (sec) | 21 | 25 | 25 |

TABLE VII-continued

EVALUATION OF POLYOLS IN POLYISOCYANURATE FOAMS

| | FOAM | | |
|---|---|---|---|
| Polyester Polyol Utilized | A Polyol No. 10[1] | B Polyol No. 11[1] | C Comparative Polyol A[1] |
| Gel Time (sec) | 40 | 53 | 41 |
| Firm Time (sec) | 44 | 57 | 45 |
| Tack Free Time (sec) | 55 | 83 | 60 |
| Density (pcf) | 2.00 | 1.95 | 1.95 |
| K-Factor[2], | | | |
| 1 day | .121 | .120 | .119 |
| 30 days | .133 | .132 | .128 |
| Friability[3] (% wt. loss) | 2 | 1 | 4 |
| Oxygen Index[4] | 22.2 | 22.5 | 22.6 |
| % Δ V max[5], | | | |
| 28 days at 70° C./95% R.H. | 18 | 20 | 21 |
| 28 days at 110° C. | 17 | 23 | 21 |

[1]Of Example 6.
[2]Units = Btu-in/hr-ft$^2$-°F.
[3]According to ASTM Test Method C-421.
[4]Flammability test conducted according to ASTM D-2863-70, except that a sample measuring 1/2" × 1/2" × 6" was used.
[5]According to ASTM Test Method D-2126.

EXAMPLE 8

This example illustrates the synthesis of polyurethane foams of 115 index utilizing aromatic polyester polyols of the invention (Polyol Nos. 10,11, 12, 13 and 14 of Example 6) and comparative aromatic polyester polyols.

The foam syntheses were conducted according to the procedure of Example 1 utilizing the ingredients and quantities thereof presented in Example 1 except that the aromatic polyester polyols employed were those listed in Table VIII below. Various characteristics of the polyurethane foams produced (Foams A–G) are shown in the table.

The data indicates that foams made from the MMG containing polyols are superior in dimensional stability to those made from the comparative polyols.

TABLE VIII

EVALUATION OF POLYOLS IN POLYURETHANE FOAMS

| | FOAM | | | | | | |
|---|---|---|---|---|---|---|---|
| Polyester Polyol Utilized | A Polyol No. 10[1] | B Polyol No. 11[1] | C Comparative Polyol A[1] | D Polyol No. 12[1] | E Polyol No. 13[1] | F Polyol No. 14[1] | G Comparative Polyol B[1] |
| Cream Time (sec) | 21 | 21 | 20 | 22 | 20 | 23 | 23 |
| Gel Time (sec) | 60 | 66 | 71 | 64 | 62 | 66 | 74 |
| Firm Time (sec) | 70 | 77 | 83 | 73 | 71 | 75 | 86 |
| Tack Free Time (sec) | 88 | 95 | — | — | 100 | — | 125 |
| Density (pcf) | 1.84 | 1.79 | 1.84 | 1.79 | 1.83 | 1.79 | 1.87 |

TABLE VIII-continued

| | FOAM | | | | | | |
|---|---|---|---|---|---|---|---|
| | A | B | C | D | E | F | G |
| Polyester Polyol Utilized | Polyol No. 10[1] | Polyol No. 11[1] | Comparative Polyol A[1] | Polyol No. 12[1] | Polyol No. 13[1] | Polyol No. 14[1] | Comparative Polyol B[1] |
| K-Factor[2], | | | | | | | |
| 1 day | .133 | .133 | .133 | .134 | .129 | .133 | .131 |
| 30 days | .145 | .144 | .145 | .142 | .148 | .144 | .144 |
| % Δ V max[3], | | | | | | | |
| 28 days at 70° C./95% R.H. | 37 | 45 | 56 | 59 | 55 | 43 | 70 |
| 28 days at 110° C. | 53 | 66 | 70 | 84 | 80 | 64 | 81 |

[1]Of Example 6.
[2]Units = Btu-in/hr-ft$^2$-°F.
[3]According to ASTM Test Method D-2126.

EXAMPLE 9

This example illustrates the transesterification of DMT process residues by using a mixture (M103) of approximately 85% dipropylene glycol (DPG) and 15% tripropylene glycol (TPG) in combination with either (a) a by-product stream of mixed monomers and glycols (MMG) or (b) phthalic anhydride (PA).

The polyols of Table IX below were prepared from the listed quantities (pbw) of the ingredients according to the procedure utilized for Polyol Nos. 1–3 of Example 1, except that comparative Polyol No. 21 was held at 225° C. for 5 instead of 2 hours.

TABLE IX

| | TRANSESTERIFIED POLYOL MIXTURES | | | | | | |
|---|---|---|---|---|---|---|---|
| POLYOL NO. | 15 | 16 | 17 | 18 | 19 | 20 | 21 |
| DMT Process Residue[1] | 318.6 | 318.6 | 318.6 | 318.6 | 382.3 | 254.9 | 5902 |
| PA | — | — | — | — | — | — | 2542.4 |
| MMG[2] | 318.6 | 318.6 | 318.6 | 318.6 | 254.9 | 382.3 | — |
| M103[3] | 352 | 352 | 331 | 350 | 432 | 275 | 11168.4 |
| EG | — | 12.5 | — | — | — | — | — |
| Tetraisopropyltitanate | 1 | 1 | 1 | 1 | 1 | 1 | 21 |
| Brookfield Viscosity at 25° C. (cps) | 32,600 | 31,800 | 45,600 | 33,300 | 31,700 | 26,700 | 24,800 |
| OH No. | 301 | 305 | 308 | 311 | 297 | 306 | 261 |
| Eq. Wt. | 186 | 184 | 182 | 180 | 189 | 184 | 215 |
| Residual Glycol (%) | 16.1 | 18.6 | — | 18.6 | 20.3 | 18.0 | 17.3 |
| Acid No. | — | — | — | 1.9 | — | — | 4.8 |

[1]Residue is defined in footnote 1 of Table I.
[2]MMG is defined in footnote 3 of Table II.
[3]M103 = Mixture of approximately 85% DPG and 15% TPG (Arco Chemical Co.).

EXAMPLE 10

This example illustrates the synthesis of polyurethane foams of 115 index utilizing Polyol Nos. 15, 19 and 20 of Example 9 and a comparative aromatic polyester polyol (Terate 203).

The foam syntheses were conducted according to the procedure of Example 1 utilizing the ingredients and quantities thereof presented in Example 1 except that the inventive aromatic polyester polyols employed were those listed in Table X below. Various characteristics of the polyurethane foams produced (Foams A-D) are shown in the table.

TABLE X
EVALUATION OF POLYOLS IN POLYURETHANE FOAMS

| | FOAM | | | |
|---|---|---|---|---|
| | A | B | C | D |
| Polyester Polyol Utilized | Polyol No. 15[1] | Polyol No. 19[1] | Polyol No. 20[1] | Terate 203[2] |
| Cream Time (sec) | 21 | 23 | 22 | 21 |
| Gel Time (sec) | 66 | 70 | 62 | 62 |
| Firm Time (sec) | 82 | 95 | 77 | 75 |
| Tack Free Time (sec) | 115 | — | — | — |
| Density (pcf) | 1.83 | 1.89 | 1.84 | 1.88 |
| K-Factor[3], | | | | |
| 1 day | .131 | .126 | .125 | .125 |
| 30 days | .151 | .147 | .145 | .141 |
| % Δ V max.[4], | | | | |
| 28 days at 70° C./95% R.H. | 29 | 29 | 28 | 27 |
| 28 days at 110° C. | 39 | 41 | 35 | 37 |

[1]Of Example 9.
[2]Terate 203 is defined in footnote 2 of Table I.
[3]Units = Btu-in/hr-ft$^2$-°F.
[4]According to ASTM Test Method D-2126.

EXAMPLE 11

This example illustrates the (a) use of both propylene glycol (PG) and the 85% DPG/15% TPG mixture (M103) of Example 9 in combination with phthalic anhydride (PA) for transesterifying DMT process residues to make polyol, and (b) use of the polyol in synthesizing polyurethane foam.

(A) TRANSESTERIFICATION

The polyols of Table XI (A) below were prepared from the listed quantities (pbw) of the ingredients according to the procedure utilized in producing Polyols Nos. 1–3 of Example 1, except that the polyols were held at 225° C. for 3 instead of 2 hours. Characteristics of the aromatic polyester polyols produced are shown in Table XI(A).

(B) SYNTHESIS OF POLYURETHANE FOAMS

Polyol No. 23 and a comparative polyol, Terate 203, were used in the preparation of polyurethane foams of 115 index.

The foam syntheses were conducted according to the procedure of Example 1 utilizing the ingredients and quantities thereof presented in Example 1 except that the inventive aromatic polyester polyol employed was Polyol No. 23. Various characteristics of the polyurethane foams produced are shown in the table.

The data indicates that the foam made from the polyol of the invention is comparable to that made from the comparative polyol.

TABLE XI

| POLYOL NO. | 22 | 23 | Terate 203[2] |
|---|---|---|---|
| A. TRANSESTERIFIED POLYOL MIXTURES | | | |
| DMT Process Residue[1] | 282 | 282 | |
| PA | 121 | 121 | |
| PG | 49.7 | 91.8 | |
| M103[3] | 447.3 | 367.2 | |
| Tetraisopropyltitanate | 1 | 1 | |
| Brookfield Viscosity at 25° C. (cps) | 40,000 | 57,200 | 20,000 |
| OH No. | 273 | 287 | 321 |
| Eq. Wt. | 204 | 196 | 175 |
| B. FOAM PROPERTIES | | | |
| Cream Time (sec) | | 28 | 25 |
| Gel Time (sec) | | 85 | 65 |
| Firm Time (sec) | | 105 | 76 |
| Tack Free Time (sec) | | 150 | 100 |
| Density (pcf) | | 1.98 | 1.97 |
| K-Factor[4], | | | |
| 1 day | | .130 | .126 |
| 30 days | | .147 | .139 |
| Dimensional Stability[5] | | | |
| % Δ V max, | | | |
| 28 days 70°/95% R.H. | | 33 | 31 |
| 28 days 110° C. | | 46 | 46 |

[1]Residue is defined in footnote 1 of Table I.
[2]Terate 203 is defined in footnote 2 of Table I.
[3]M103 is defined in footnote 3 of Table IX.
[4]Units = Btu-in/hr-ft$^2$-°F.
[5]According to ASTM Test Method D-2126.

EXAMPLE 12

This example illustrates the compatibility with a fluorocarbon blowing agent (R-11B) of aromatic polyester polyols of the invention and of a comparative aromatic polyester polyol (Terate 203), and the synthesis of polyurethane foam (115 index) from the polyols.

A mixture of equal parts by weight of R-11B and each polyester polyol was formed in a can by adding the fluorocarbon to the polyol with high speed stirring. The contents of the beaker were immediately decanted into a 9 oz. wide-mouthed glass jar. The jar was sealed and allowed to stand overnight, whereupon the top layer (polyol+R-11B) was decanted into a paper cup. The contents of the cup were poured into a tared, round-bottom flask and the flask was degassed under vacuum to remove the R-11B. After removal of the R-11B, the flask was weighed and the loss in weight was taken to be the R-11B solubility.

The inventive polyester polyols (Polyol Nos. 24 and 25) whose fluorocarbon solubility was tested were prepared from the listed quantities of ingredients of Table XII below. In addition to the R-11B solubility, the table shows the polyols' viscosity, hydroxyl number and equivalent weight and the dimensional stability of polyurethane foams (115 index) made therefrom. These foams were produced following the procedure and utilizing the ingredients and quantities thereof presented in Example 1 except that the inventive polyols were those listed in Table XII.

The results indicate that the inventive polyols give foams whose properties are comparable to those of the foam made with Terate 203. Also, the fluorocarbon solubility of Polyol No. 25 is significantly better than that of Terate 203.

TABLE XII

| POLYOL NO. | 24[1] | 25[1] | Terate 203[2] |
|---|---|---|---|
| A. TRANSESTERIFIED POLYOL MIXTURES | | | |
| DMT Process Residue[3] | 240 | 240 | |
| PET[4] | 240 | 240 | |
| DEG | 319 | | |
| M103[5] | | 449 | |
| Tetraisopropyltitanate | 1 | 1 | |
| R-11B Solubility[6] (%) | 16 | 39 | 16 |
| Brookfield Viscosity (cps) | 23,300 | 31,800 | 20,000 |
| OH No. | 316 | 294 | 321 |
| Eq. Wt. | 177 | 191 | 175 |
| B. FOAM DIMENSIONAL STABILITY | | | |
| % Δ V max[7]., 28 days | | | |
| 70° C./95% R.H. | 23 | 25 | 26 |
| 110° C. | 37 | 50 | 43 |

[1]Prepared according to the procedure used for Polyol No. 1 of Example 1.
[2]Terate 203 is defined in footnote 2 of Table I.
[3]Residue is defined in footnote 1 of Table I.
[4]PET is defined in footnote 3 of Table I.
[5]M103 is defined in footnote 3 of Table IX.
[6]Solubility - (Wt. R-11B/Wt. R-11B + Wt. Polyol) × 100.
[7]According to ASTM Test Method D-2126.

EXAMPLE 13

This example illustrates the synthesis of polyurethane foams (115 index) utilizing inventive Polyol No. 15 of Example 9 and two comparative polyols.

The foam syntheses were conductd according to the procedure of Example 1 utilizing the ingredients and quantities thereof presented in Example 1 except that the inventive aromatic polyester polyol employed was Polyol No. 15 and two comparative aromatic polyester polyols were employed. Various characteristics of the polyurethane foams produced (Foams A–C) are shown in the table.

The data indicates that the foam made from Polyol No. 15 of the invention is superior to that made from comparative Polyol No. 21 and comparable to that made from Terate 203. Additionally, Polyol Nos. 15 and 21 were found to have R-11B solubilities of 31% and >50%, respectively, as compared to 16% for Terate 203.

TABLE VIII
EVALUATION OF POLYOLS IN POLYURETHANE FOAMS

| | FOAM | | |
|---|---|---|---|
| Polyester Polyol Utilized | A<br>Polyol<br>No. 15[1] | B<br>Polyol<br>No. 21[1] | C<br>Terate<br>203[2] |
| Cream Time (sec) | 21 | 24 | 23 |
| Gel Time (sec) | 65 | 85 | 63 |
| Firm Time (sec) | 85 | 108 | 82 |
| Tack Free Time (sec) | 120 | 150 | — |
| Density (pcf) | 2.01 | 1.98 | 1.82 |
| K-Factor[3], 30 days | .144 | .151 | .141 |
| % Δ V max[4], 28 days | | | |
| 70° C./95% R.H. | 19 | 40 | 22 |
| 110° C. | 30 | 56 | 30 |

[1]Of Example 9.
[2]Terate 203 is defined in footnote 2 of Table I.
[3]Units = Btu-in/hr-ft[2]-°F.
[4]According to ASTM Test Method D-2126.

We claim:

1. A polyester polyol composition suitable for use in a foam-forming reaction with an organic polyisocyanate in the manufacture of a polyurethane or polyisocyanurate foam and characterized by a hydroxyl number of from about 150 to about 950 and a Brookfield viscosity at 25° C. of from about 500 to about 500,000 cps, the polyester polyol being the reaction product of polycarboxylic acid and polyol components, wherein the polyol component comprises
    (a) at least one alkylene glycol of the formula:

$$HO-R_1-OH$$

wherein $R_1$ is a straight or branched chain alkylene group having two to five carbon atoms, and is unsubstituted or substituted by at least one member selected from the group consisting of halogen, hydroxy, nitro and amino,
    (b) at least one higher alkylene glycol, and
    (c) optionally at least one additional polyol.

2. The composition of claim 1 wherein alkylene glycol (a) is at least one member selected from the group consisting of ethylene glycol and propylene glycol and mixtures thereof.

3. The composition of claim 1 comprising an aromatic polyester polyol having a hydroxyl number of from about 230 to about 650 and an average functionality of about 1.8 to about 5.

4. The composition of claim 1 comprising the reaction product of at least one member selected from the group consisting of (a) ester-containing by-products from the manufacture of dimethyl terephthalate, (b) scrap polyalkylene terephthalates, (c) phthalic anhydride, (d) residues from the manufacture of phthalic anhydride, (e) terephthalic acid, (f) residues from the manufacture of terephthalic acid, (g) isophthalic acid and (h) trimellitic anhydride and mixtures thereof, and the polyol component.

5. The composition of claim 4 wherein alkylene glycol (a) is at least one member selected from the group consisting of ethylene glycol and propylene glycol and mixtures thereof, and higher alkylene glycol (b) is represented by the formula:

$$HO{+}CH-CH-O{\overline{)_x}}H$$
$$\phantom{HO+}|\phantom{CH-}|$$
$$\phantom{HO+}R''\phantom{H-}R''$$

wherein R'' represents H or CH₃ with the proviso that both R''s cannot be CH₃ and x represents a number of from 2 to 10.

6. The composition of claim 4 wherein the polyol component is a polycarboxylic acid component-containing polyol comprising
    (a) at least one alkylene glycol of the formula:

$$HO-R_1-OH$$

wherein $R_1$ is a straight or branched chain alkylene group having two to five carbon atoms, and is unsubstituted or substituted by at least one member selected from the group consisting of halogen, hydroxy, nitro and amino,
    (b) at least one higher alkylene glycol,
    (c) a mixture of monomers and oligomers having the formula:

$$HO-R-\overset{O}{\overset{\|}{C}}-R'''-\overset{O}{\overset{\|}{C}}{+}O-R'-\overset{O}{\overset{\|}{C}}-R'''-\overset{O}{\overset{\|}{C}}{\overline{)_y}}R-OH$$

wherein each R and R' may be the same or different and represent
    (i) a radical of the formula:

$${+}CH-CH-O{\overline{)_z}}$$
    $$\phantom{+}|\phantom{CH-}|$$
    $$\phantom{+}R''\phantom{H-}R''$$

wherein R'' represents H or CH₃ with the proviso that both R''s cannot be CH₃, and z represents a number of from 0 to 10 if R is the radical and a number of from 1 to 10 if R' is the radical, and
    (ii) optionally a divalent radical of at least one additional dihydric alcohol, and
    wherein R''' represents an aromatic radical having from 6 to 12 carbon atoms, and y represents a number of from 0 to 10, and
    (d) optionally at least one additional dihydric alcohol.

7. The composition of claim 1 comprising the polyester polyol prepared by the transesterification of
    (A) a residue remaining after dimethyl terephthalate and methyl p-toluate have been removed from the product of oxidation of p-xylene in the preparation of dimethyl terephthalate with
    (B) a transesterifying polyol component comprising
        (a) at least one alkylene glycol selected from the group consisting of ethylene glycol and propylene glycol and mixtures thereof, and
        (b) at least one higher alkylene glycol of the formula:

$$HO{+}CH-CH-O{\overline{)_x}}H$$
        $$\phantom{HO+}|\phantom{CH-}|$$
        $$\phantom{HO+}R''\phantom{H-}R''$$

wherein R'' represents H or CH₃ with the proviso that both R''s cannot be CH₃ and x represents a number of from 2 to 10, and
        (c) optionally at least one additional polyol.

8. The composition of claim 7 which includes polyethylene terephthalate as an additional reactant and wherein alkylene glycol (a) is the ethylene glycol which is generated from the polyethylene terephthalate during the transesterification.

9. The composition of claim 7 wherein residue (a) is the residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids 10. The composition of claim 9 wherein the transesterifying polyol component is a polycarboxylic acid componentcontaining polyol comprising
   (a) at least one alkylene glycol selected from the group consisting of ethylene glycol and propylene glycol and mixtures thereof,
   (b) at least one higher alkylene glycol of the formula:

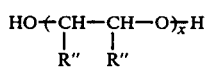

wherein R'' represents H or CH₃ with the proviso that both R''s cannot be CH₃ and x represents a number of from 2 to 4,
   (c) a mixture of monomers and oligomers having the formula:

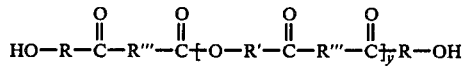

wherein each R and R' may be the same or different and represent
   (i) a radical of the formula:

and z represents a number of from 0 to 4 if R is the radical and a number of from 1 to 4 if R' is the radical, and
   (ii) optionally a divalent radical of at least one additional dihydric alcohol, and
   wherein R''' represents phenylene and y represents a number of from 0 to 3, and
   (d) optionally at least one additional dihydric alcohol.

11. The composition of claim 10 which includes as an additional reactant at least one polycarboxylic acid component selected from the group consisting of phthalic anhydride; phthalic acid; isophthalic acid; esters of said polycarboxylic acid components; and a mixture of the composition:

| Component | % By Weight |
|---|---|
| H₃COOC—⌬—COOCH₃ | 18 ± 8 |
| H₃COOC—⌬—COOCH₃ (meta) | 50 ± 10 |
| ⌬(COOCH₃)₂ (ortho) | 6 ± 2 |
| H₃COOC—⌬(CH₃)—COOCH₃ | 6 ± 2 |
| H₃COOC—⌬—C(OCH₃)₂ | 6 ± 2 |
| H₃C—⌬—COOCH₃ | 5 ± 3 |
| H₃COOC—⌬—CHO | 4 ± 3 |
| H₃C—⌬—COOH | 2 ± 1 |
| HOOC—⌬—COOCH₃ | 1 ± 0.6 |
| other aromatic compounds and mixtures thereof. | 2 ± 1; |

12. The composition of claim 10 wherein alkylene glycol (a) is ethylene glycol and which is characterized by a viscosity in cps. at 25° C. of about 2,000 to about 40,000, a free glycol content of from about 10 to about 22 percent by weight of the polyester polyol, a hydroxyl number within a range of from about 275 to about 400, and an acid number of about 0.2 to about 10.

13. The composition of claim 10 wherein the polycarboxylic acid component-containing polyol is a mixture comprising
   (a) ethylene glycol,
   (b) at least one member selected from the group consisting of diethylene glycol, triethylene glycol, tetraethylene glycol, dipropylene glycol and tripropylene glycol and mixtures thereof, and
   (c) a mixture of monomers and oligomers having the formula:

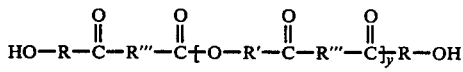

wherein each R and R' may be the same or different and represent
   (i) a radical of the formula:

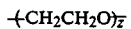

and z represents a number of from 0 to 4 if R is the radical and a number of from 1 to 4 if R' is the radical, and
   (ii) a radical of the formula:

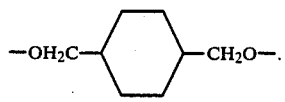

14. The composition of claim 13 which is characterized by a viscosity in cps. at 25° C. of about 2,000 to about 40,000, a free glycol content of from about 10 to about 22 percent by weight of the polyester polyol, a hydroxyl number within a range of from about 275 to about 400, and an acid number of about 0.2 to about 10.

15. A blend comprising a fluorocarbon blowing agent and the polyester polyol of claim 1, wherein higher alkylene glycol (b) includes at least one member selected from the group consisting of dipropylene glycol and at least one higher polypropylene glycol and mixtures thereof to increase the fluorocarbon solubility of the polyester polyol.

16. The blend of claim 15 which additionally contains at least one component selected from the group consisting of a polyether polyol having a functionality greater than 2, a catalyst, a flame retardant, and a surfactant and mixtures thereof.

17. A blend comprising a fluorocarbon blowing agent and the polyester polyol of claim 5, wherein higher alkylene glycol (b) includes at least one member selected from the group consisting of dipropylene glycol and at least one higher polypropylene glycol and mixtures thereof to increase the fluorocarbon solubility of the polyester polyol.

18. The blend of claim 17 which additionally contains at least one component selected from the group consisting of a polyether polyol having a functionality greater than 2, a catalyst, a flame retardant, and a surfactant and mixtures thereof.

19. A blend comprising a fluorocarbon blowing agent and the polyester polyol of claim 6, wherein higher alkylene glycol (b) includes at least one member selected from the group consisting of dipropylene glycol and at least one higher polypropylene glycol and mixtures thereof to increase the fluorocarbon solubility of the polyester polyol.

20. The blend of claim 19 which additionally contains at least one component selected from the group consisting of a polyether polyol having a functionality greater than 2, a catalyst, a flame retardant, and a surfactant and mixtures thereof.

21. A blend comprising a fluorocarbon blowing agent and the polyester polyol of claim 7, wherein higher alkylene glycol (b) includes at least one member selected from the group consisting of dipropylene glycol and at least one higher polypropylene glycol and mixtures thereof to increase the fluorocarbon solubility of the polyester polyol.

22. The blend of claim 21 which additionally contains at least one component selected from the group consisting of a polyether polyol having a functionality greater than 2, a catalyst, a flame retardant, and a surfactant and mixtures thereof.

23. A blend comprising a fluorocarbon blowing agent and the polyester polyol of claim 10, wherein higher alkylene glycol (b) includes at least one member selected from the group consisting of dipropylene glycol and at least one higher polypropylene glycol and mixtures thereof to increase the fluorocarbon solubility of the polyester polyol.

24. The blend of claim 23 which additionally contains at least one component selected from the group consisting of a polyether polyol having a functionality greater than 2, a catalyst, a flame retardant, and a surfactant and mixtures thereof.

25. A blend comprising a fluorocarbon blowing agent and the polyester polyol of claim 12, wherein higher alkylene glycol (b) includes at least one member selected from the group consisting of dipropylene glycol and at least one higher polypropylene glycol and mixtures thereof to increase the fluorocarbon solubility of the polyester polyol.

26. The blend of claim 25 which additionally contains at least one component selected from the group consisting of a polyether polyol having a functionality greater than 2, a catalyst, a flame retardant, and a surfactant and mixtures thereof.

27. A blend comprising a fluorocarbon blowing agent and the polyester polyol of claim 13, wherein higher alkylene glycol (b) includes at least one member selected from the group consisting of dipropylene glycol and at least one higher polypropylene glycol and mixtures thereof to increase the fluorocarbon solubility of the polyester polyol.

28. The blend of claim 27 which additionally contains at least one component selected from the group consisting of a polyether polyol having a functionality greater than 2, a catalyst, a flame retardant, and a surfactant and mixtures thereof.

29. A blend comprising a fluorocarbon blowing agent and the polyester polyol of claim 14, wherein higher alkylene glycol (b) includes at least one member selected from the group consisting of dipropylene glycol and at least one higher polypropylene glycol and mixtures thereof to increase the fluorocarbon solubility of the polyester polyol.

30. The blend of claim 29 which additionally contains at least one component selected from the group consisting of a polyether polyol having a functionality greater than 2, a catalyst, a flame retardant, and a surfactant and mixtures thereof.

31. A process for preparing the polyester polyol of claim 1 by reacting polycarboxylic acid and polyol components, wherein the polyol component comprises
(a) at least one alkylene glycol of the formula:

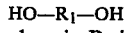
wherein $R_1$ is a straight or branched chain alkylene group having two to five carbon atoms, and is unsubstituted or substituted by at least one member selected from the group consisting of halogen, hydroxy, nitro and amino ,
(b) at least one higher alkylene glycol, and
(c) optionally at least one additional polyol.

32. A polyisocyanurate foam comprising the reaction product of an organic polyisocyanate, a blowing agent, a trimerization catalyst, and a minor amount of a polyol, wherein from about 5 to 100 weight percent of the polyol comprises the polyester polyol of claim 1.

33. The polyisocyanurate foam of claim 32 wherein the polyisocyanate is a polymethylene polyphenyl polyisocyanate, the blowing agent is a fluorocarbon, and the polyester polyol is a polycarboxylic acid component-containing polyol comprising
(a) at least one alkylene glycol of the formula:

wherein $R_1$ is a straight or branched chain alkylene group having two to five carbon atoms, and is unsubstituted or substituted by at least one member selected from the group consisting of halogen, hydroxy, nitro and amino,
(b) at least one higher alkylene glycol,
(c) a mixture of monomers and oligomers having the formula:

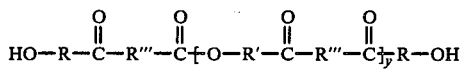

wherein each R and R' may be the same or different and represent
(i) a radical of the formula:

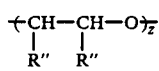

wherein R" represents H or $CH_3$ with the proviso that both R"s cannot be $CH_3$, and z represents a number of from 0 to 10 if R is the radical and a number of from 1 to 10 if R' is the radical, and
(ii) optionally a divalent radical of at least one additional dihydric alcohol, and
wherein R'" represents an aromatic radical having from 6 to 12 carbon atoms, and y represents a number of from 0 to 10, and
(d) optionally at least one additional dihydric alcohol.

34. The polyisocyanurate foam of claim 32 wherein the polyisocyanate is a polymethylene polyphenyl polyisocyanate, the blowing agent is a fluorocarbon, and the polyester polyol comprises the transesterification reaction
(A) a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids, and
(B) a polycarboxylic acid component-containing polyol comprising
(a) at least one alkylene glycol selected from the group consisting of ethylene glycol and propylene glycol and mixtures thereof,
(b) at least one higher alkylene glycol of the formula:

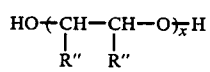

wherein R" represents H or $CH_3$ with the proviso that both R"s cannot be $CH_3$ and x represents a number of from 2 to 4,
(c) a mixture of monomers and oligomers having the formula:

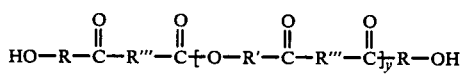

wherein each R and R' may be the same or different and represent
(i) a radical of the formula:

$-(CH_2CH_2O)_{\overline{z}}$ and z represents a number of from 0 to 4 if R is the radical and a number of from 1 to 4 if R' is the radical, and
(ii) optionally a divalent radical of at least one additional dihydric alcohol, and
wherein R'" represents phenylene and y represents a number of from 0 to 3, and
(d) optionally at least one additional dihydric alcohol.

35. The polyisocyanurate foam of claim 34 wherein alkylene glycol (a) is ethylene glycol and the polyester polyol is characterized by a viscosity in cps. at 25° C. of about 2,000 to about 40,000, a free glycol content of from about 10 to about 22 percent by weight of the polyester polyol, a hydroxyl number within a range of from about 275 to about 400, and an acid number of about 0.2 to about 10.

36. The polyisocyanurate foam of claim 34 wherein the polycarboxylic acid component-containing polyol is a mixture comprising
(a) ethylene glycol,
(b) at least one member selected from the group consisting of diethylene glycol, triethylene glycol, tetraethylene glycol, dipropylene glycol and tripropylene glycol and mixtures thereof, and
(c) a mixture of monomers and oligomers having the formula:

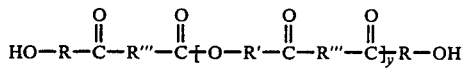

wherein each R and R' may be the same or different and represent
(i) a radical of the formula:

$-(CH_2CH_2O)_{\overline{z}}$ and z represents a number of from 0 to 4 if R is the radical and a number of from 1 to 4 if R' is the radical, and
(ii) a radical of the formula:

37. The polyisocyanurate foam of claim 36 wherein the polyester polyol is characterized by a viscosity in cps. at 25° C. of about 2,000 to about 40,000, a free glycol content of from about 10 to about 22 percent by weight of the polyester polyol, a hydroxyl number within a range of from about 275 to about 400, and an acid number of about 0.2 to about 10.

38. A polyurethane foam comprising the reaction product of an organic polyisocyanate, a blowing agent, a catalyst and a polyol, wherein from about 5 to 100 weight percent of the polyol comprises the polyester polyol of claim 1.

39. The polyurethane foam of claim 38 wherein the polyisocyanate is a polymethylene polyphenyl polyisocyanate, the blowing agent is a fluorocarbon, and the polyester polyol is a polycarboxylic acid component-containing polyol comprising
(a) at least one alkylene glycol of the formula:

HO—R$_1$—OH wherein R$_1$ is straight or branched chain alkylene group having two to five carbon atoms, and is unsubstituted or substituted by at least one member selected from the group consisting of halogen, hydroxy, nitro and amino, (b) at least one higher alkylene glycol, (c) a mixture of monomers and oligomers having the formula:

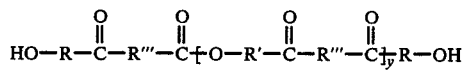

wherein each R and R' may be the same or different and represent (i) a radical of the formula:

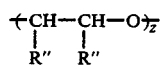

wherein R'' represents H or CH$_3$ with the proviso that both R''s cannot be CH$_3$, and z represents a number of from 0 to 10 if R is the radical and a number of from 1 to 10 if R' is the radical, and (ii) optionally a divalent radical of at least one additional dihydric alcohol, and wherein R''' represents an aromatic radical having from 6 to 12 carbon atoms, and y represents a number of from 0 to 10, and (d) optionally at least one additional dihydric alcohol.

40. The polyurethane foam of claim 38 wherein the polyisocyanate is a polymethylene polyphenyl polyisocyanate, the blowing agent is a fluorocarbon, and the polyester polyol comprises the transesterification reaction product of (A) a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids, and (B) a polycarboxylic acid component-containing polyol comprising (a) at least one alkylene glycol selected from the group consisting of ethylene glycol and propylene glycol and mixtures thereof, (b) at least one higher alkylene glycol of the formula:

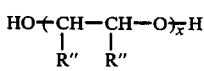

wherein R'' represents H or CH$_3$ with the proviso that both R''s cannot be CH$_3$ and x represents a number of from 2 to 4, (c) a mixture of monomers and oligomers having the formula:

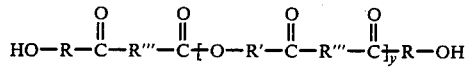

wherein each R and R' may be the same or different and represent (i) a radical of the formula:

$+CH_2CH_2O)_{\overline{z}}$ and z represents a number of from 0 to 4 if R is the radical and a number of from 1 to 4 if R' is the radical, and (ii) optionally a divalent radical of at least one additional dihydric alcohol, and wherein R''' represents phenylene and y represents a number of from 0 to 3, and (d) optionally at least one additional dihydric alcohol.

41. The polyurethane foam of claim 40 wherein alkylene glycol (a) is ethylene glycol and the polyester polyol is characterized by a viscosity in cps. at 25° C. of about 2,000 to about 40,000, a free glycol content of from about to about 22 percent by weight of the polyester polyol, a hydroxyl number within a range of from about 275 to about 400, and an acid number of about 0.2 to about 10.

42. The polyurethane foam of claim 40 wherein the polycarboxylic acid component-containing polyol is a mixture comprising (a) ethylene glycol, (b) at least one member selected from the group consisting of diethylene glycol, triethylene glycol, tetraethylene glycol, dipropylene glycol and tripropylene glycol and mixtures thereof, and (c) a mixture of monomers and oligomers having the formula:

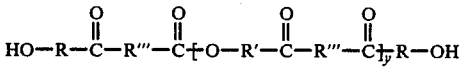

wherein each R and R' may be the same or different and represent (i) a radical of the formula:

$+CH_2CH_2O)_{\overline{z}}$ and z represents a number of from 0 to 4 if R is the radical and a number of from 1 to 4 if R' is the radical, and (ii) a radical of the formula:

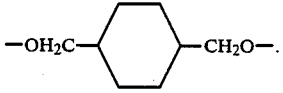

43. The polyurethane foam of claim 42 wherein the polyester polyol is characterized by a viscosity in cps. at 25° C. of about 2,000 to about 40,000, a free glycol content of from about 10 to about 22 percent by weight of the polyester polyol, a hydroxyl number within a range of from about 275 to about 400, and an acid number of about 0.2 to about 10.

44. A laminate comprising at least one facing sheet adhered to the polyisocyanurate foam of claim 32.

45. A laminate comprising at least one facing sheet adhered to the polyurethane foam of claim 38.

* * * * *